(12) United States Patent
Kuo et al.

(10) Patent No.: US 10,192,278 B2
(45) Date of Patent: Jan. 29, 2019

(54) TRACEABLE DATA AUDIT APPARATUS, METHOD, AND NON-TRANSITORY COMPUTER READABLE STORAGE MEDIUM THEREOF

(71) Applicant: Institute For Information Industry, Taipei (TW)

(72) Inventors: Yen-Hung Kuo, Taipei (TW); Tzu-Wei Yeh, New Taipei (TW); Guang-Yan Zheng, Taichung (TW)

(73) Assignee: Institute For Information Industry, Taipei (TW)

( * ) Notice: Subject to any disclaimer, the term of this patent is extended or adjusted under 35 U.S.C. 154(b) by 273 days.

(21) Appl. No.: 15/072,247

(22) Filed: Mar. 16, 2016

(65) Prior Publication Data
US 2017/0270315 A1 Sep. 21, 2017

(51) Int. Cl.
*G06F 17/30* (2006.01)
*G06Q 50/26* (2012.01)
*G06F 21/62* (2013.01)

(52) U.S. Cl.
CPC ..... *G06Q 50/265* (2013.01); *G06F 17/30309* (2013.01); *G06F 21/6254* (2013.01)

(58) Field of Classification Search
CPC ............ G06Q 50/265; G06F 17/30309; G06F 21/6254
See application file for complete search history.

(56) References Cited

U.S. PATENT DOCUMENTS

| 2016/0132694 A1* | 5/2016 | Dhoolia | G06F 21/6245 713/165 |
| 2017/0124336 A1* | 5/2017 | Freudiger | G06F 21/602 |
| 2017/0149793 A1* | 5/2017 | Spertus | H04L 63/105 |

* cited by examiner

Primary Examiner — Jay A Morrison
(74) Attorney, Agent, or Firm — Skaar Ulbrich Macari, P.A.

(57) ABSTRACT

A traceable data audit apparatus, method, and non-transitory computer readable storage medium thereof are provided. The traceable data audit apparatus is stored with an original data set. The original data set includes a plurality of records and is defined with a plurality of fields. Each of the records has a plurality of items corresponding to the fields one-on-one. The fields are classified into an identity sensitive subset and an identity insensitive subset. The traceable data audit apparatus generates a released data set by applying a de-identification operation to each of the items corresponding to the fields in the identity sensitive subset and stores an audit log of the original data set. The audit log includes a date, a consumer identity, an identity of the original data set, and a plurality of evidences. Each of the evidence is one of the records of the released data set.

18 Claims, 9 Drawing Sheets

| To-be-processed item | Rounded numeric | Released item | Round (Released item) |
|---|---|---|---|
| 94721.36 | 94500 | 94712 | 94500 |
| 97434.16 | 97500 | 97254 | 97500 |
| 98507.13 | 98500 | 98686 | 98500 |
| 99029.03 | 99000 | 98997 | 99000 |
| 99319.7 | 99500 | 99676 | 99500 |
| 99497.47 | 99500 | 99546 | 99500 |
| 99613.89 | 99500 | 99514 | 99500 |
| 99694.19 | 99500 | 99288 | 99500 |
| 99751.86 | 100000 | 99869 | 100000 |

TRACEABLE DATA AUDIT APPARATUS, METHOD, AND NON-TRANSITORY COMPUTER READABLE STORAGE MEDIUM THEREOF

FIELD

The present invention relates to a traceable data audit apparatus, method, and non-transitory computer readable storage medium thereof. More particularly, the present invention relates to a traceable data audit apparatus, method, and non-transitory computer readable storage medium thereof that adding traceable information during the de-identification procedure.

BACKGROUND

With the rapid development in computer technologies, more and more enterprises collect, store, manipulate, and organize every kind of information/data in computers. Since business opportunities, research topics, etc. may be hidden in these huge amount of data/information, some enterprises sell their data for money. It is possible that a user buys data (called "released data") from an enterprise and then distributes copies of the data to other users, which means that other users derive these data for free. Currently, there is no technique for tracing a released data in the data market. Even a manager of an enterprise has the doubt that some data may be originated form his/her company, there is no way to prove that.

Consequently, there is an urgent need for a mechanism that can trace released data without harming the precision of the data severely.

SUMMARY

The disclosure includes a traceable data audit apparatus comprising a storage unit, an interface, and a processing unit, wherein the processing unit is electrically connected to the storage unit and the interface. The storage unit is stored with an original data set and a plurality of existing audit logs. The original data set comprises a plurality of records and is defined with a plurality of fields. Each of the records has a plurality of items corresponding to the fields one-on-one. The fields are classified into a first identity sensitive subset and a first identity insensitive subset. The interface is configured to receive a request for the original data set, wherein the request corresponds to a consumer identity. The processing unit is configured to generate a released data set by applying a de-identification operation to each of the items corresponding to the fields in the identity sensitive subset in response to the request and store an audit log of the original data set in the storage unit as one of the existing audit logs. The audit log comprises a date, the consumer identity, an identity of the original data set, and a plurality of evidences and each of the evidence is one of the records of the released data set. The interface further delivers the released data set. The interface further receives a leaking data set. The leaking data set comprises a plurality of leaking records and being defined with a plurality of fields. Each of the leaking records has a plurality of items corresponding to the fields of the leaking data set one-on-one. The fields of the leaking data set are classified into a second identity sensitive subset and a second identity insensitive subset. The processing unit further determines a filtered audit log set by normalizing a plurality of fields of each of the existing audit logs and selecting the existing audit logs that have at least one field the same as one of the fields of the leaking data set. The processing unit further determines a filtered leaking data set by matching the items corresponding to the second identity insensitive subset of each leaking record with the items corresponding to the first identity insensitive subset of the evidences of each existing audit log of the filtered audit log set. The processing unit further calculates a confidence factor for each existing audit log of the filtered audit log set by matching the items corresponding to the second identity sensitive subset of each leaking record of the filtered leaking data set with the items corresponding to the first identity sensitive subset of the evidences of each existing audit log of the filtered audit log set.

The disclosure also includes a traceable data audit method for use in an electronic device. The electronic device is stored with an original data set and a plurality of existing audit logs. The original data set comprises a plurality of records and is defined with a plurality of fields. Each of the records has a plurality of items corresponding to the fields one-on-one. The fields are classified into a first identity sensitive subset and a first identity insensitive subset. The traceable data audit method comprises the following steps of: (a) receiving a request for the original data set, wherein the request corresponds to a consumer identity, (b) generating a released data set by applying a de-identification operation to each of the items corresponding to the fields in the identity sensitive subset in response to the request, (c) storing an audit log of the original data set in the electronic device as one of the existing audit logs, wherein the audit log comprises a date, the consumer identity, an identity of the original data set, and a plurality of evidences, wherein each of the evidence is one of the records of the released data set, (d) delivering the released data set, (e) receiving a leaking data set, wherein the leaking data set comprises a plurality of leaking records and is defined with a plurality of fields, each of the leaking records has a plurality of items corresponding to the fields of the leaking data set one-on-one, the fields of the leaking data set are classified into a second identity sensitive subset and a second identity insensitive subset, (f) determining a filtered audit log set by normalizing a plurality of fields of each of the existing audit logs and selecting the existing audit logs that have at least one field the same as one of the fields of the leaking data set, (g) determining a filtered leaking data set by matching the items corresponding to the second identity insensitive subset of each leaking record with the items corresponding to the first identity insensitive subset of the evidences of each existing audit log of the filtered audit log set, and (h) calculating a confidence factor for each existing audit log of the filtered audit log set by matching the items corresponding to the second identity sensitive subset of each leaking record of the filtered leaking data set with the items corresponding to the first identity sensitive subset of the evidences of each existing audit log of the filtered audit log set.

The disclosure further includes a non-transitory computer readable storage medium. The non-transitory computer readable storage medium has a computer program stored therein. The computer program executes the aforementioned traceable data audit method after being loaded into an electronic device. The electronic device is stored with an original data set and a plurality of existing audit logs. The original data set comprises a plurality of records and is defined with a plurality of fields. Each of the records has a plurality of items corresponding to the fields one-on-one. The fields are classified into a first identity sensitive subset and a first identity insensitive subset.

The disclosure also includes a traceable data audit method comprising: (a) receiving a request for the original data set, wherein the request corresponds to a consumer identity, (b) generating a released data set by applying a de-identification operation to each of the items corresponding to the fields in the identity sensitive subset in response to the request, (c) storing an audit log of the original data set in the electronic device as one of the existing audit logs, wherein the audit log comprises a date, the consumer identity, an identity of the original data set, and a plurality of evidences, wherein each of the evidence is one of the records of the released data set, (d) delivering the released data set, (e) receiving a leaking data set, wherein the leaking data set comprises a plurality of leaking records and is defined with a plurality of fields, each of the leaking records has a plurality of items corresponding to the fields of the leaking data set one-on-one, the fields of the leaking data set are classified into a second identity sensitive subset and a second identity insensitive subset, (f) determining a filtered audit log set by normalizing a plurality of fields of each of the existing audit logs and selecting the existing audit logs that have at least one field the same as one of the fields of the leaking data set, (g) determining a filtered leaking data set by matching the items corresponding to the second identity insensitive subset of each leaking record with the items corresponding to the first identity insensitive subset of the evidences of each existing audit log of the filtered audit log set, and (h) calculating a confidence factor for each existing audit log of the filtered audit log set by matching the items corresponding to the second identity sensitive subset of each leaking record of the filtered leaking data set with the items corresponding to the first identity sensitive subset of the evidences of each existing audit log of the filtered audit log set.

When there is a request for an original data set, a released version (e.g. a released data set) of the original data set is generated by applying de-identification operations to the items corresponding to the fields in identity sensitive subset. Each of the de-identification operation is able to de-identify an item as well as insert traceable information to that item. Along with the generation of the released version, the present invention stores an audit log of the released version. The audit log comprises a date, the consumer identity, an identity of the original data set, and a plurality of evidences. Since each of the evidences in the audit log is one of the records of the released version, it can be considered as a fingerprint of the released data set. Once there is a leaking data set, the present invention can identify the source of the leakage by comparing the leaking data set with existing audit logs. Therefore, the released data set of the original data set is traceable.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the traceable data audit apparatus, method, and non-transitory computer readable storage medium thereof will be explained with reference to example embodiments thereof. Nevertheless, these example embodiments are not intended to limit the present invention to any specific examples, embodiments, environments, applications, or implementations described in these example embodiments. Therefore, the description of these example embodiments is only for the purpose of illustration rather than limit the scope of the present invention. It shall be appreciated that elements not directly related to the present invention are omitted from depictions in the following embodiments and attached drawings.

Figure 1A:
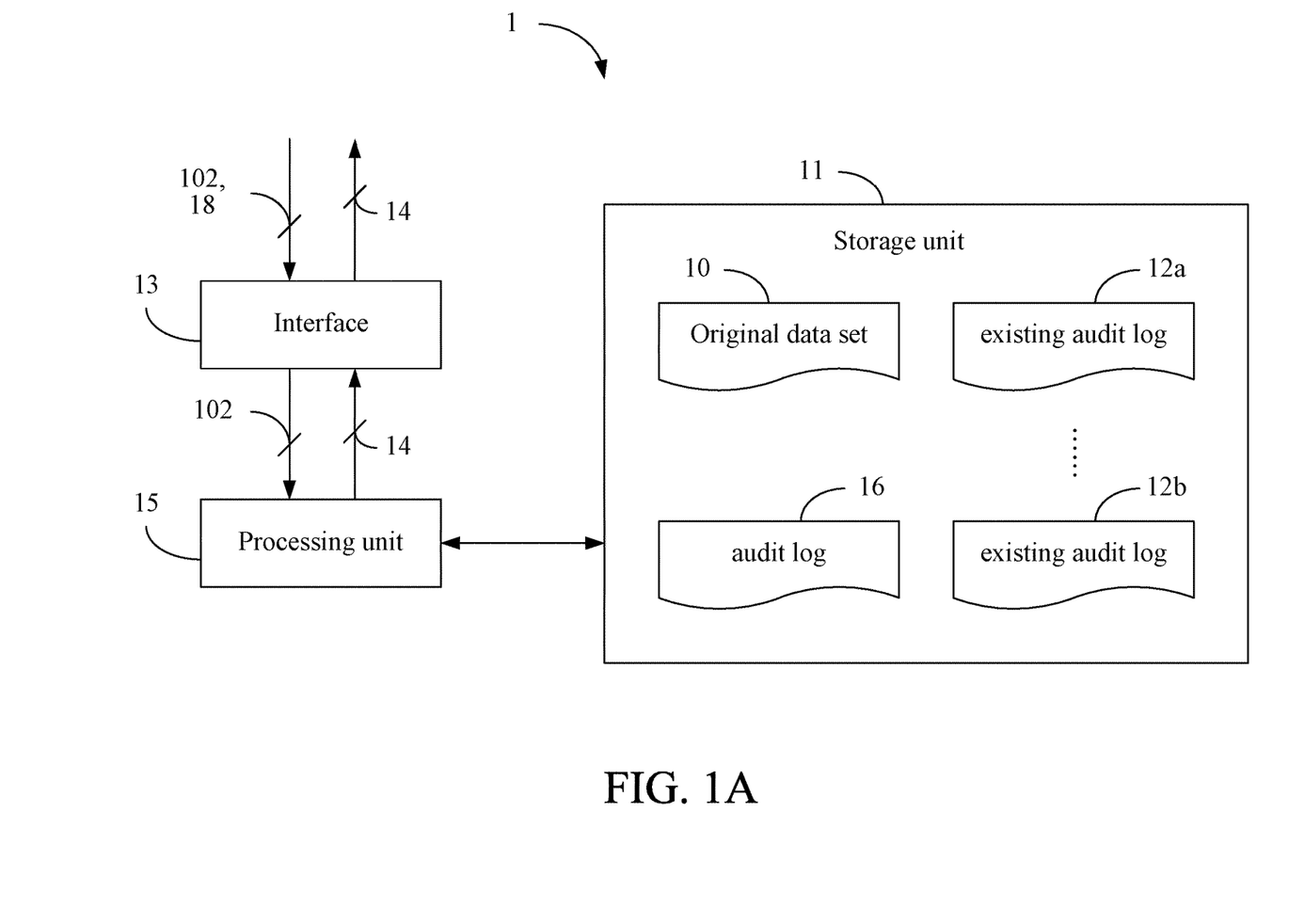
FIG. 1A illustrates a schematic view of a traceable data audit apparatus 1 of the first embodiment.

A first embodiment of the present invention is a traceable data audit apparatus 1 and a schematic view of which is illustrated in FIG. 1A. The traceable data audit apparatus 1 may be used in a data marketplace and have the traceability of sold data. The traceable data audit apparatus 1 comprises a storage unit 11, an interface 13, and a processing unit 15, wherein the processing unit 15 is electrically connected to the storage unit 11 and the interface 13. The storage unit 11 may be a memory, a Universal Serial Bus (USB) disk, a hard disk, a compact disk (CD), a mobile disk, a magnetic tape, a database, or any other storage media or circuit with the same function and well known to those of ordinary skill in the art. The interface 13 may be any interface that can receive and transmit signals. The processing unit 15 may be any of various processors, central processing units (CPUs), microprocessors, or other computing devices well known to those of ordinary skill in the art.

Figure 1B:
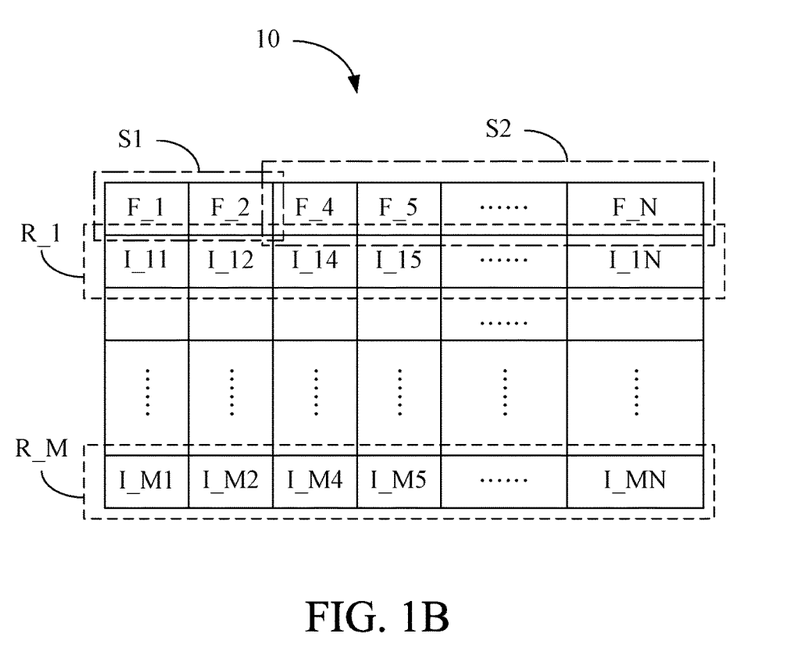
FIG. 1B illustrates a schematic view of the original data set 10.

The storage unit 11 is stored with an original data set 10. When the traceable data audit apparatus 1 is used in a data marketplace, the original data set 10 may be data for sell. It is noted that the present invention does not limit the number of original data set stored in the storage unit 11 to any specific number. Please refer to FIG. 1B for a schematic view of the original data set 10. The original data set 10 comprises a plurality of records $R\_1, \ldots, R\_M$ and is defined with a plurality of fields $F\_1, F\_2, F\_4, F\_5, \ldots, F\_N$. Each of the records $R\_1, \ldots, R\_M$ has a plurality of items corresponding to the fields $F\_1, F\_2, F\_4, F\_5, \ldots, F\_N$ one-on-one. As shown in FIG. 1B, the records $R\_1$ has items $I\_11, I\_12, I\_14, I\_15, \ldots, I\_1N$ corresponding to the fields $F\_1, F\_2, F\_4, F\_5, \ldots, F\_N$ one-on-one, $\ldots$, and the records $R\_M$ has items $I\_M1, I\_M2, I\_M4, I\_M5, \ldots, I\_MN$ corresponding to the fields $F\_1, F\_2, F\_4, F\_5, \ldots, F\_N$. For example, when the original data set 10 is related to salaries of employees, the fields $F\_1, F\_2, F\_4, F\_5, \ldots, F\_N$ may include name of employee, name of company, address, education, salary, etc. In this example, each of the records $R\_1, \ldots, R\_M$ is a record of a specific employee and includes the name of the specific employee, the name of the company that the specific employee is worked for, the address of the specific employee, education of the specific employee, salary of the specific employee, etc. It is noted that the present invention does not limit the format of an original data set to a table, which means that the format the original data set 10 shown in FIG. 1B is simply an example for illustration.

Furthermore, the fields F_1, F_2, F_4, F_5, . . . , F_N are classified into an identity sensitive subset S1 and an identity insensitive subset S2. To be more specific, a field that is related to identity sensitive information (e.g. salary, address) will be classified into the identity sensitive subset S1 and a field that is not related to identity sensitive information will be classified into the identity insensitive subset S2. For convenience, it is assumed that the identity sensitive subset S1 includes the fields F_1, F_2 and the identity insensitive subset S2 includes the rest fields (i.e. the fields F_4, F_5, . . . , F_N) in this embodiment.

It is assumed that a user is interested in the original data set 10 and sends a request 102 to the traceable data audit apparatus 1 for the original data set 10 (e.g. a request for buying the original data set 10). Since the request 102 is from the user, the request 102 corresponds to a consumer identity of the user. In response to the request 102, the traceable data audit apparatus 1 generates a released data set 14 of the original data set 10 for the user and stores an audit log 16 regarding this transaction in the storage unit 11.

The details regarding the generation of the released data set 14 are given in the following descriptions. The processing unit 15 of the traceable data audit apparatus 1 generates the released data set 14 by applying a de-identification operation to each of the items corresponding to the fields in the identity sensitive subset S1. For convenience, each of the items corresponding to the fields in the identity sensitive subset S1 may be called a to-be-processed item. As to the items corresponding to the fields in the identity insensitive subset S2, they remain the same in the released data set 14.

The de-identification operation processes a to-be-processed item depending on the type of the to-be-processed item. In this embodiment, a to-be-processed item (i.e. an item that is going to be de-identified) may be a numeric or a text. When a to-be-processed item is a numeric, the de-identification operation is a round operation. When a to-be-processed item is a text, the de-identification operation is an encryption operation. For convenience, it is assumed that the items I_11, . . . , I_M1 corresponding to the field F_1 are numeric and the items I_12, . . . , I_M2 corresponding to the field F_2 are text.

Figure 1C:
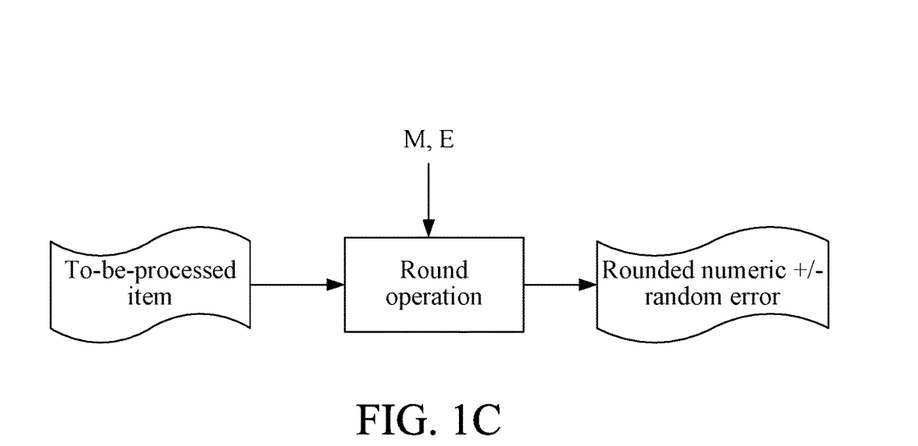
FIG. 1C is the illustration of a round operation.

Please refer to FIG. 1C for the illustration of the round operation. The processing unit 15 adopts a multiple M as a rounding base and decides an error boundary E for the round operation according to the multiple M. To achieve a better result, the error boundary E is a half of the multiple M. The processing unit 15 applies the de-identification operation to a to-be-processed item by rounding the to-be-processed item into a rounded numeric by the multiple M, generating a random error bounded by the error boundary E, and synthesizing the random error and the rounded numeric by either adding the random error to the rounded numeric or subtracting the random error from the rounded numeric. In this embodiment, since the items I_11, . . . , I_M1 corresponding to the field F_1 are numeric, the processing unit 15 applies the round operation to each of the items I_11, . . . , I_M1 corresponding to the field F_1.

Figure 1D:
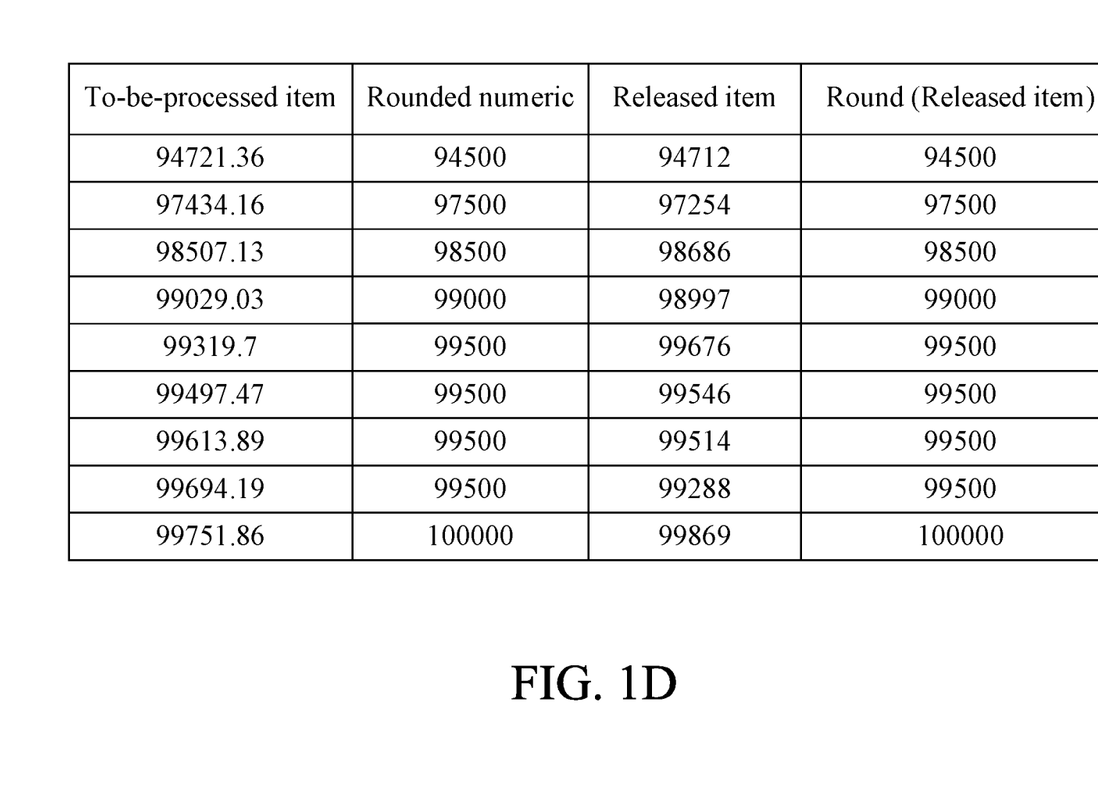
FIG. 1D illustrates a concrete example of the round operation.

Please refer to FIG. 1D for a concrete example of the round operation. In this example, the multiple M (i.e. the rounding base) is 500 and the error boundary E is 250. In FIG. 1D, nine rows are given and each row has four values. For each row, the value in the first column is a to-be-processed item, the value in the second column is the rounded numeric of the to-be-processed item, the value in the third column is a released item (i.e. the value of either adding the rounded numeric with a random error or subtracting the random error from the rounded numeric), and the value in the fourth column is the value of rounding the released item. It is emphasized that since the error boundary E is a half of the multiple M in this example, the values in the fourth column are equivalent to the values in the second column. It means that the traceable data audit apparatus 1 is able to generate unique de-identified released items, which also guarantees that each generated released item still keeps the rounding characteristic of the corresponding rounded numeric since the rounded numeric can be re-obtained by rounding the released item. For example, rounding the released item 94712 to 94500 is equivalent to the rounded numeric by rounding the to-be-processed item 94721.36.

Figure 1E:
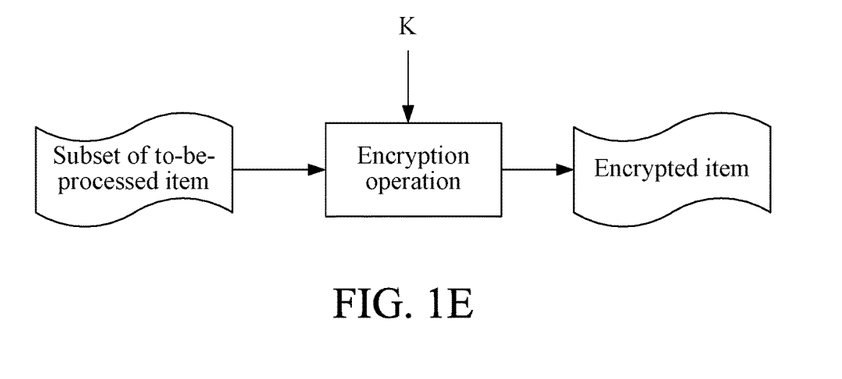
FIG. 1E is the illustration of the encryption operation.

Please refer to FIG. 1E for the illustration of the encryption operation. The processing unit 15 applies the de-identification operation to a to-be-processed item by encrypting a subset of the to-be-processed item into an encrypted item by a random encryption key K. It is noted that a subset of a to-be-processed item may be a portion of the to-be-processed item or the whole to-be-processed item. In this embodiment, since the items I_12, . . . , I_M2 corresponding to the field F_2 are text, the processing unit 15 applies the encryption operation to each of the items I_12, . . . , I_M2 corresponding to the field F_2.

Figure 1F:
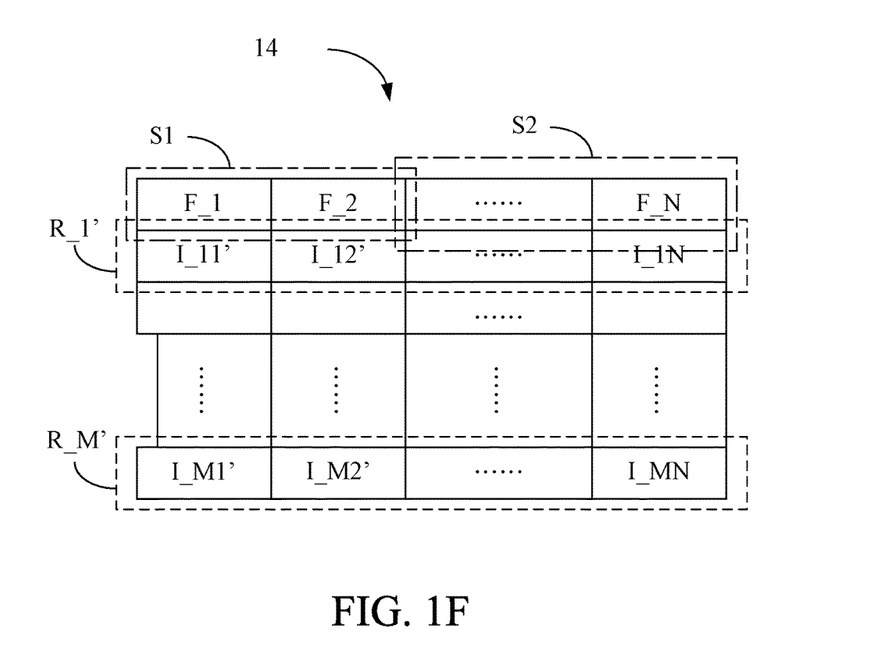
FIG. 1F is the illustration of the released data set 14.

For better understanding, please refer to FIG. 1F for the illustration of the released data set 14. The released data set 14 comprises a plurality of records R_1', . . . , R_M' corresponding to the records R_1, . . . , R_M one-on-one. The items I_11, . . . , I_M1 of the original data set 10 are de-identified into the de-identified items I_11', . . . , I_M1' in the released data set 14 by the rounded operation. The items I_12, . . . , I_M2 of the original data set 10 are de-identified into the de-identified items I_12', . . . , I_M2' in the released data set 14 by the encryption operation.

The interface 13 delivers the released data set 14 to the user. In some embodiments, the processing unit 15 processes the original data set 10 record by record, which means the released data set 14 is generated record by record. For these embodiments, the interface 13 may deliver the released data set 14 to the user record by record.

Figure 1G:
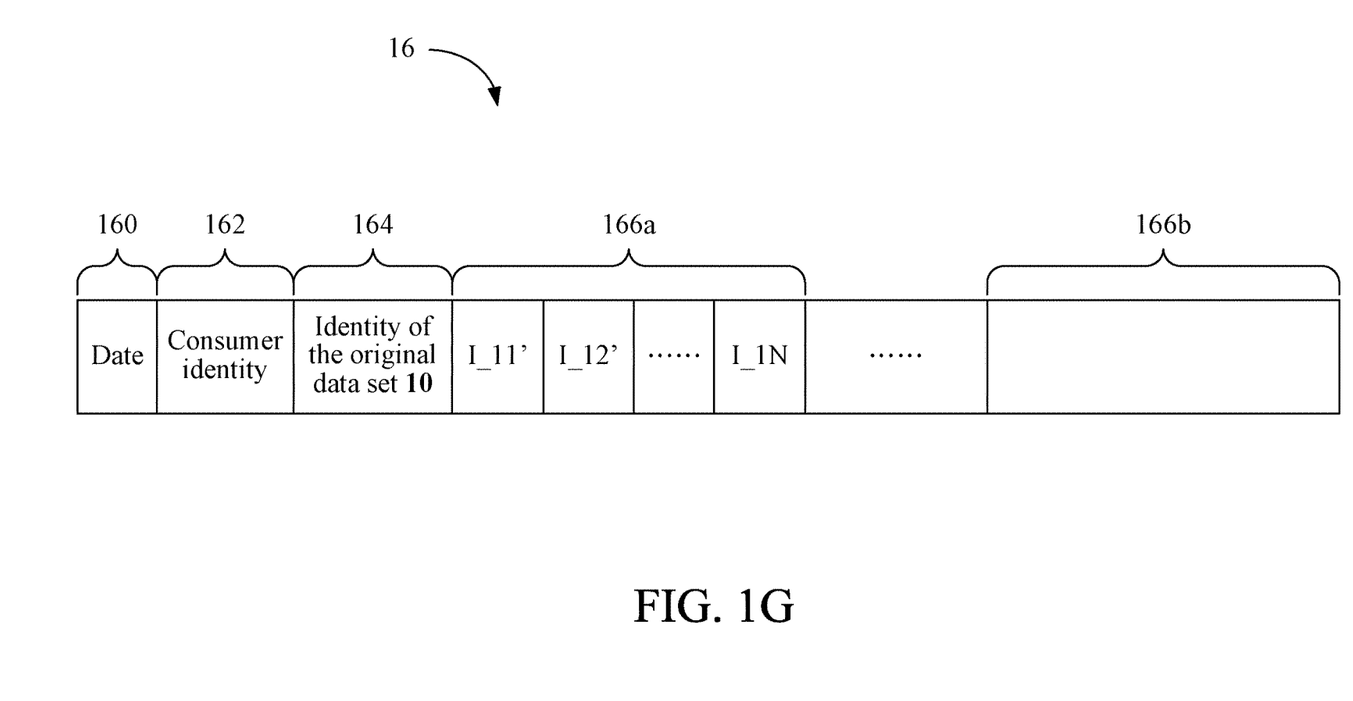
FIG. 1G is the illustration of the audit log 16.

As mentioned, the traceable data audit apparatus 1 stores an audit log 16 regarding this transaction (i.e. regarding the generation of the released data set 14 from the original data set 10) in the storage unit 11. That is, the processing unit 15 stores the audit log 16 of the original data set 10 in the storage unit 11. As shown in FIG. 1G, the audit log 16 comprises a date 160, the consumer identity 162 corresponding to the request 102, an identity 164 of the original data set 10, and a plurality of evidences 166a, . . . , 166b. The date 160 may be the date that the traceable data audit apparatus 1 receives the request 102, the date that the traceable data audit apparatus 1 generate the released data set 14, and/or a date that convey the information regarding the request 102 and/or the released data set 14. The processing unit 15 selects some of the records R_1', . . . , R_M' of the released data set 14 as the evidences 166a, . . . , 166b of audit log 16. It means that each of the evidences 166a, . . . , 166b of the audit log 16 is one of the records R_1', . . . , R_M' of the released data set 14. For example, the processing unit 15 may select one one-hundredth of the records R_1', . . . , R_M' of the released data set 14 as the evidences of audit log 16. For example, the evidences 166a is the records R_1' of the released data set 14. In some embodiments, the processing unit 15 may further encrypt the random encryption key K by a system public key (not shown) and the audit log 16 further comprises the encrypted random encryption key K. The audit log 16 can be considered as the fingerprint of the released data set 14.

After the audit log 16 is stored in the storage unit 11, it can be treated as an existing audit log. The storage unit 11 is also stored with a plurality of existing audit log 12a, . . . , 12b, wherein each of the audit log 12a, . . . , 12b comprises a date, a consumer identity, an identity of an original data set, and a plurality of evidences. Based on the above descriptions, a person having ordinary skill in the art is able to understand the content of the existing audit log 12a, . . . , 12b. Therefore, the details of the existing audit log 12a, . . . , 12b are not repeated. It is emphasized that the audit log 12a, . . . , 12b may corresponds to different original data sets; that is, the audit log 12a, . . . , 12b may be fingerprints of different original data sets.

Figure 1H:
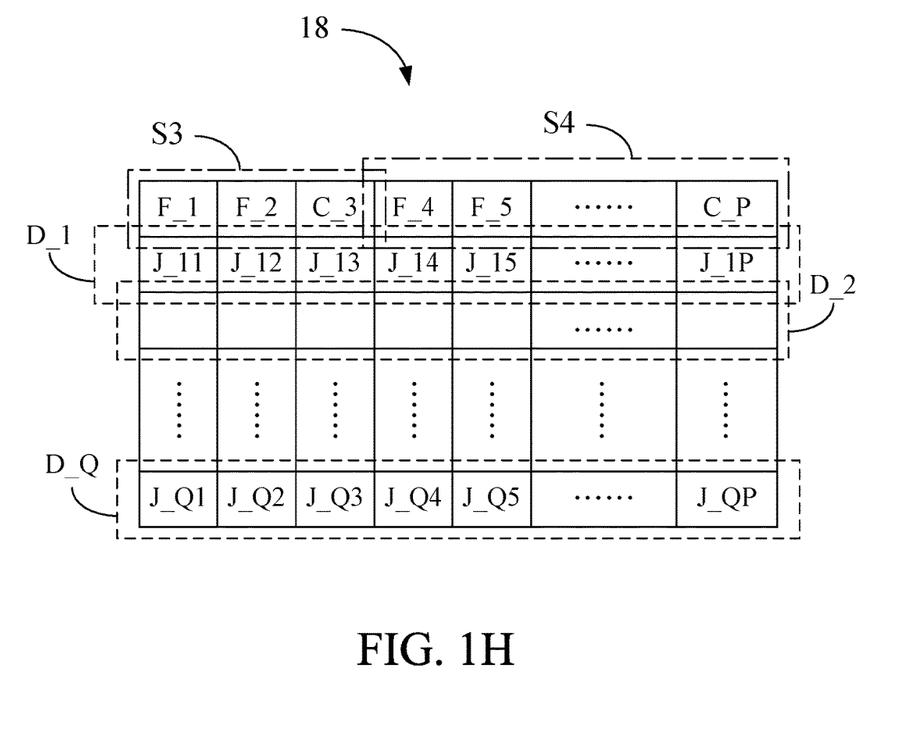
FIG. 1H is the illustration of leaking data set 18.

At a later stage, the manager of the traceable data audit apparatus 1 may be aware of a leaking data set 18 as shown in FIG. 1H and would like to know the source of the leakage (i.e. the leaking data set 18 is distributed by which consumer).

The interface 13 receives the leaking data set 18 to analyze the source of the leakage. The leaking data set 18 comprises a plurality of leaking records $D\_1, D\_2, \ldots, D\_Q$ and is defined with a plurality of fields $F\_1, F\_2, C\_3, F\_4, F\_5, \ldots, C\_P$. Each of the leaking records $D\_1, D\_2, \ldots, D\_Q$ has a plurality of items corresponding to the fields $F\_1, F\_2, C\_3, F\_4, F\_5, \ldots, C\_P$ of the leaking data set 18 one-on-one. For example, the leaking record $D\_1$ comprises items $J\_11, J\_12, J\_13, J\_14, J\_15, \ldots, J\_1P$ corresponding to the fields $F\_1, F\_2, C\_3, F\_4, F\_5, \ldots, C\_P$ one-on-one, . . . , the leaking record $D\_Q$ comprises items $J\_Q1, J\_Q2, J\_Q3, J\_Q4, J\_Q5, \ldots, J\_QP$ corresponding to the fields $F\_1, F\_2, C\_3, F\_4, F\_5, \ldots, C\_P$ one-on-one. The fields $F\_1, F\_2, C\_3, F\_4, F\_5, \ldots, C\_P$ of the leaking data set 18 are classified into an identity sensitive subset S3 and an identity insensitive subset S4.

Since each of the existing audit logs 12a, . . . , 12b, 16 records a consumer identity, the existing audit logs 12a, . . . , 12b, 16 are considered as having information of data-leakage candidates. First, the processing unit 15 reduces the number of the existing audit logs 12a, . . . , 12b, 16. To be more specific, the processing unit 15 determines a filtered audit log set (not shown) by normalizing a plurality of fields of each of the existing audit logs 12a, . . . , 12b and selecting the existing audit logs 12a, . . . , 12b, 16 that have at least one field the same as one of the fields $F\_1, F\_2, C\_3, F\_4, F\_5, \ldots, C\_P$ of the leaking data set 18. Each of the existing audit logs 12a, . . . , 12b, 16 comprises a plurality of evidences, wherein each of the evidences comprises a plurality of items corresponding to a plurality of fields. If an existing audit log and the leaking data set 18 have a common field, that existing audit log is selected as a member of the filtered audit log set. It is emphasized again that the fields are normalized before determining whether there is a common field between the leaking data set 18 and each of the existing audit logs.

After determining the filtered audit log set, the processing unit 15 further determines a filtered leaking data set by matching the items corresponding to fields in the identity insensitive subset S4 of each of the leaking records $D\_1, D\_2, \ldots, D\_Q$ with the items corresponding to the fields in the identity insensitive subset of the evidences of each existing audit log in the filtered audit log set. To be more specific, the processing unit 15 compares each of the leaking records $D\_1, D\_2, \ldots, D\_Q$ with the evidences of each existing audit log in the filtered audit log set. The processing unit 15 determines an intersection of the fields comprised in the identity insensitive subset S4 of the leaking data set 18 and the fields comprised in the identity insensitive subset of each of the existing audit log in the filtered audit log set. In other words, an intersection comprises the common identity insensitive fields between the leaking data set 18 and one of the existing audit log in the filtered audit log set. The processing unit 15 keeps the leaking records whose items corresponding to the common identity insensitive fields are the same as the items corresponding to the common identity insensitive fields of any of the evidences in the existing audit log in the filtered audit log set.

A concrete example regarding the matching between the leaking records $D\_1$ with the evidences 166a, . . . , 166b of the audit log 16 is given herein for better understanding. The processing unit 15 determines an intersection of the fields comprised in the identity insensitive subset S4 of the leaking data set 18 (i.e. the fields $F\_4, F\_5, \ldots, C\_P$) and the fields comprised in the identity insensitive subset of the audit log 16 (i.e. the fields $F\_4, F\_5$). In this example, the intersection comprises common identity insensitive fields $F\_4, F\_5$. Then, the processing unit 15 compares the items corresponding to the fields $F\_4, F\_5$ of the leaking record $D\_1$ with the items corresponding to the fields $F\_4, F\_5$ of each of the evidences 166a, . . . , 166b. If the items corresponding to the fields $F\_4, F\_5$ of the leaking record $D\_1$ are equivalent to the items corresponding to the fields $F\_4, F\_5$ of any of the evidences 166a, . . . , 166b, the processing unit 15 keeps the leaking record $D\_1$ in the filtered leaking data set.

After determining the filtered audit log set and the filtered leaking data set, the processing unit 15 calculates a confidence factor for each existing audit log in the filtered audit log set. For each existing audit log in the filtered audit log set, the processing unit 15 calculates a confidence factor by matching the items corresponding to the identity sensitive subset of each evidence with the items corresponding to the identity sensitive subset S3 of each leaking record in the filtered leaking data set. An existing audit log having more items equivalent with the items of each leaking record in the filtered leaking data set has a higher confidence factor.

After calculating the confidence factor for each existing audit log in the filtered audit log set, the processing unit 15 may be able to determine the source of the leakage of the leaking data set 18 (i.e. the leaking data set 18 is distributed by which consumer) according to the confidence factors. That is, the consumer identity of the existing audit log that has the highest confidence factor is considered as the source of the leakage.

In some embodiments, there may be an upload procedure for the original data set 10 before the original data set 10 can be requested for. In the upload procedure, the interface 13 receives the original data set 10 from a first user of a first company. Then, the interface 13 receives a set of de-identification rules from a second user of the first company, wherein the first user and the second user may be the same user. Each of the de-identification rules is related to a de-identification operation of a field in the identity sensitive subset S1. Next, the interface 13 receives an instruction indicating that the original data set 10 can be released and then releases the original data set 10. After the original data set 10 is released, the traceable data audit apparatus 1 can receive the request 102 for the original data set 10.

According to the above descriptions, the released data set 14 of the original data set 10 is traceable. When there is a request for the original data set 10, the traceable data audit apparatus 1 generates a released version (e.g. the released data set 14) by applying de-identification operations to the items corresponding to the fields in identity sensitive subset. Each of the de-identification operation is able to de-identify an item as well as insert traceable information to that item. Along with the generation of the released version, the traceable data audit apparatus 1 stores an audit log of the released version. The audit log comprises a date, the consumer identity, an identity of the original data set, and a plurality of evidences. Since each of the evidences in the audit log is one of the records of the released version, it can be considered as a fingerprint of the released data set. Once there is a leaking data set, the traceable data audit apparatus 1 can identify the source of the leakage by comparing the leaking data set with existing audit logs.

Figure 2A:
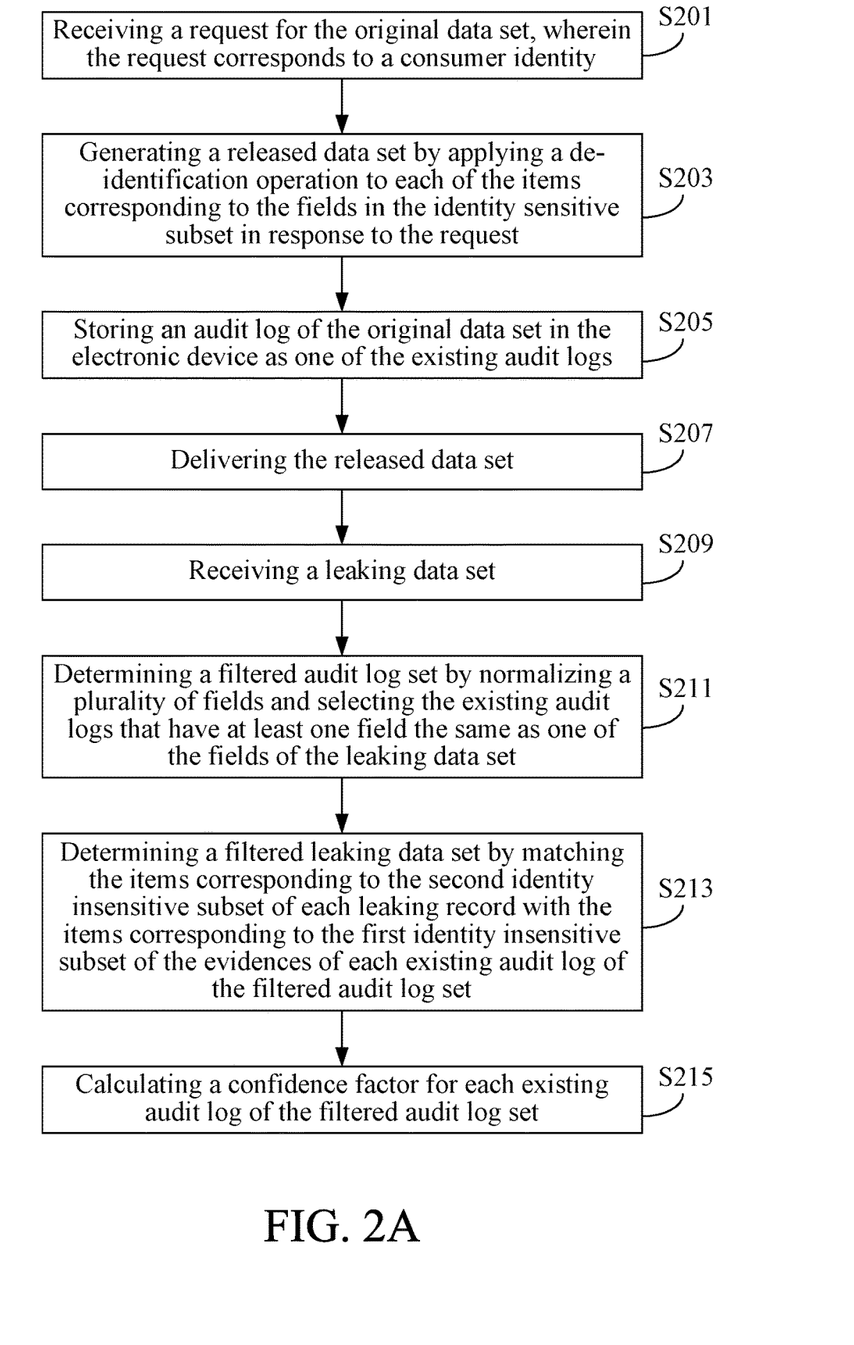
FIG. 2A is flowchart of the traceable data audit method in the second embodiment.

A second embodiment of the present invention is a traceable data audit method for use in an electronic device (e.g. the traceable data audit apparatus 1 of the first embodiment). The electronic device is stored with an original data set and a plurality of existing audit logs. The original data set comprises a plurality of records and is defined with a plurality of fields, wherein each of the records has a plurality of items corresponding to the fields one-on-one. The fields are classified into a first identity sensitive subset and a first identity insensitive subset. A flowchart of the traceable data audit method is illustrated in FIG. 2A.

First, step S201 is executed by the electronic device for receiving a request for the original data set, wherein the request corresponds to a consumer identity. Next, step S203 is executed by the electronic device for generating a released data set by applying a de-identification operation to each of the items corresponding to the fields in the identity sensitive subset in response to the request.

Particularly, the de-identification operation processes a to-be-processed item depending on the type of the to-be-processed item. In this embodiment, a to-be-processed item (i.e. an item that is going to be de-identified) may be a numeric or a text. When a to-be-processed item is a numeric, the de-identification operation is a round operation. When a to-be-processed item is a text, the de-identification operation is an encryption operation.

Figure 2B:
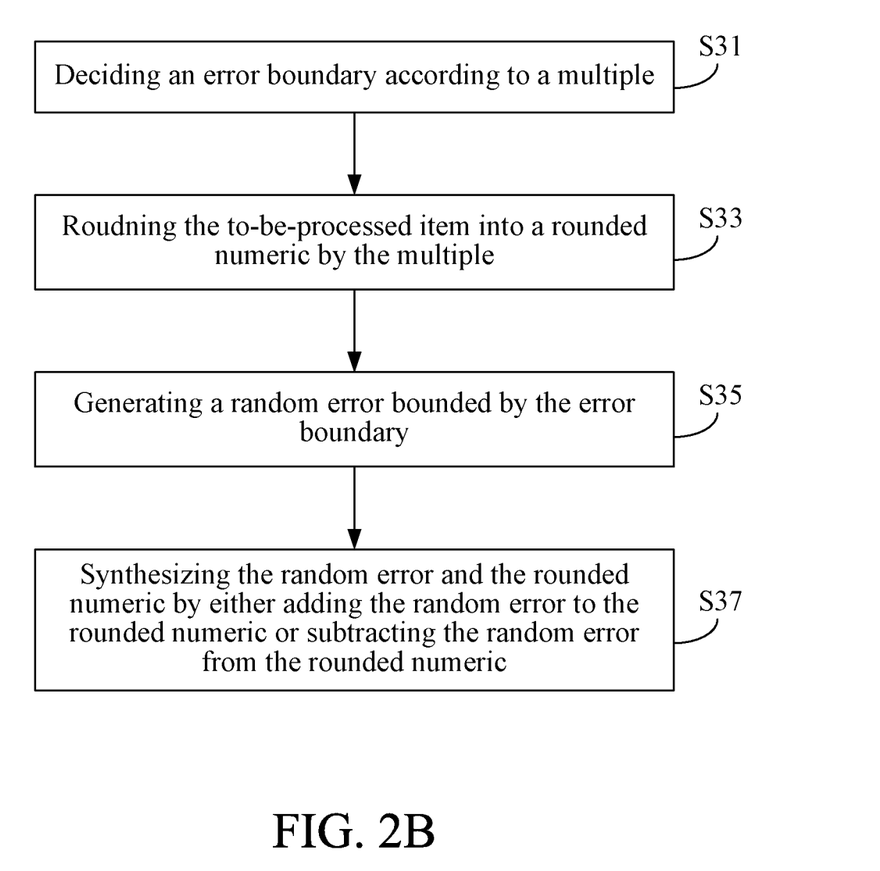
FIG. 2B illustrates the steps related to a round operation.

FIG. 2B illustrates the steps related to a round operation. First, step S31 is executed by the electronic device for deciding an error boundary according to a multiple. In some embodiments, the error boundary is a half of the multiple. It is noted that for the items corresponding to the same field, the step S31 is executed only once. Next, steps S33, S35, and S37 are executed by the electronic device for applying the de-identification operation to the to-be-processed item. In the step S33, the electronic device rounds the to-be-processed item into a rounded numeric by the multiple. Next, the step S35 is executed by the electronic device for generating a random error bounded by the error boundary. Following that, the step S37 is executed by the electronic device for synthesizing the random error and the rounded numeric by either adding the random error to the rounded numeric or subtracting the random error from the rounded numeric.

When a to-be-processed item is a text, the step S203 applies the de-identification operation to the to-be-identified item by encrypting a subset of the to-be-identified item by a random encryption key. In some embodiments, the traceable data audit method may further execute a step (not shown) for encrypting the random encryption key by a system public key.

After the step S203, step S205 is executed by the electronic device for storing an audit log of the original data set in the electronic device as one of the existing audit logs. The audit log comprises a date, the consumer identity, an identity of the original data set, and a plurality of evidences, wherein each of the evidence is one of the records of the released data set. In some embodiments, the audit log may further comprise the encrypted random encryption key. Next, step S207 is executed by the electronic device for delivering the released data set.

At some instant, step S209 is executed by the electronic device for receiving a leaking data set. The leaking data set comprises a plurality of leaking records and is defined with a plurality of fields. Each of the leaking records has a plurality of items corresponding to the fields of the leaking data set one-on-one. The fields of the leaking data set are classified into a second identity sensitive subset and a second identity insensitive subset.

Following that, step S211 is executed by the electronic device for determining a filtered audit log set by normalizing a plurality of fields of each of the existing audit logs and selecting the existing audit logs that have at least one field the same as one of the fields of the leaking data set. Next, step S213 is executed by the electronic device for determining a filtered leaking data set by matching the items corresponding to the second identity insensitive subset of each leaking record with the items corresponding to the first identity insensitive subset of the evidences of each existing audit log of the filtered audit log set. Afterwards, step S215 is executed by the electronic device for calculating a confidence factor for each existing audit log of the filtered audit log set by matching the items corresponding to the second identity sensitive subset of each leaking record of the filtered leaking data set with the items corresponding to the first identity sensitive subset of the evidences of each existing audit log of the filtered audit log set.

After calculating the confidence factor for each existing audit log in the filtered audit log set, the traceable data audit method may be able to determine the source of the leakage of the leaking data set according to the confidence factors. That is, the consumer identity of the existing audit log that has the highest confidence factor is considered as the source of the leakage.

Figure 2C:
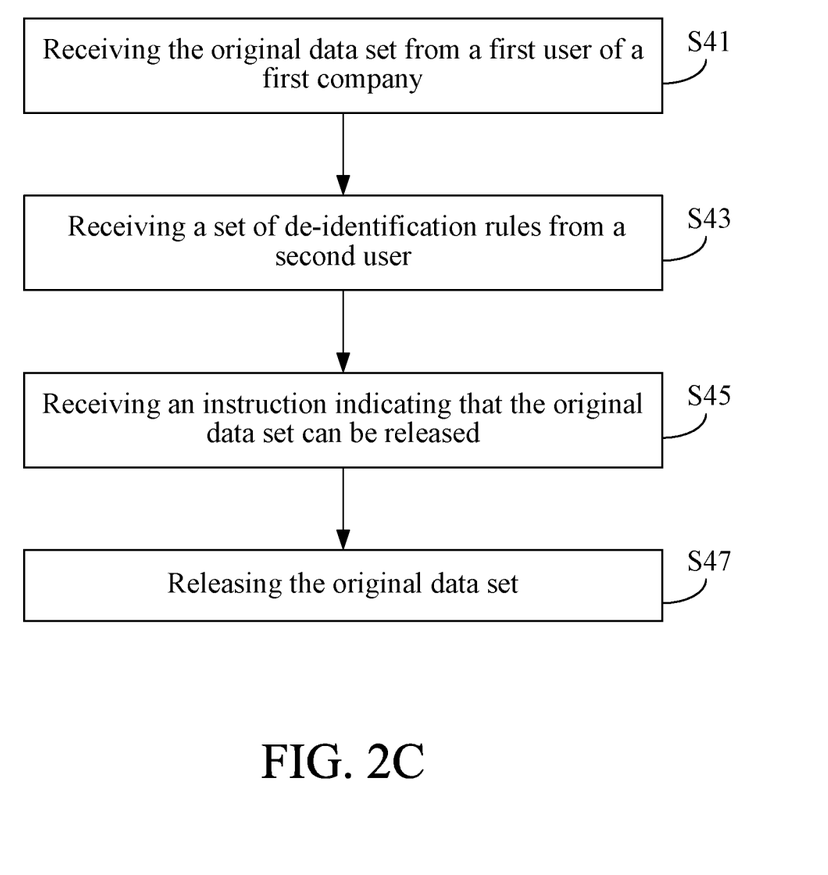
FIG. 2C illustrates the flowchart of an upload procedure for the original data set.

In some embodiments, the traceable data audit method may further execute an upload procedure for the original data set as shown in FIG. 2C. The steps in FIG. 2C are executed earlier than the steps shown in FIG. 2A. In step S41, the electronic device receives the original data set from a first user of a first company. Following that, step S43 is executed by the electronic device for receiving a set of de-identification rules from a second user. Next, step S45 is executed by the electronic device for receiving an instruction indicating that the original data set can be released. Next, step S47 is executed by the electronic device for releasing the original data set. After the original data set is released, the traceable data audit method can receive the request for the original data set.

In addition to the aforesaid steps, the second embodiment can also execute all the operations and function set forth in the first embodiment. How the second embodiment executes these operations and functions will be readily appreciated by those of ordinary skill in the art based on the explanation of the first embodiments, and thus will not be further described herein.

The traceable data audit method described in the second embodiment may be implemented by a computer program having a plurality of codes. The computer program is stored in a non-transitory computer readable storage medium. When the codes are loaded into an electronic device (e.g. the traceable data audit apparatus 1 in the first embodiment), the computer program executes the traceable data audit method as described in the second embodiment. The non-transitory computer readable storage medium may be an electronic product, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above descriptions, when there is a request for an original data set, the present invention generates a released version (e.g. a released data set) of the original data set by applying de-identification operations to the items corresponding to the fields in identity sensitive subset. Each of the de-identification operation is able to de-identify an item as well as insert traceable information to that item. Along with the generation of the released version, the present invention stores an audit log of the released version. The audit log comprises a date, the consumer identity, an identity of the original data set, and a plurality of evidences. Since each of the evidences in the audit log is one of the records of the released version, it can be considered as a fingerprint of the released data set. Once there is a leaking data set, the present invention can identify the source of the leakage by comparing the leaking data set with existing audit logs. Therefore, the released data set of the original data set is traceable.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A traceable data audit apparatus, comprising:
a non-transitory computer readable storage medium, being stored with an original data set and a plurality of existing audit logs, the original data set comprising a plurality of records and being defined with a plurality of fields, each of the records having a plurality of items corresponding to the fields one-on-one, the fields being classified into a first identity sensitive subset and a first identity insensitive subset;
an interface, being configured to receive a request for the original data set, the request corresponding to a consumer identity; and
a processor, being electrically connected to the non-transitory computer readable storage medium and the interface and configured to generate a released data set by applying a de-identification operation to each of the items corresponding to the fields in the identity sensitive subset in response to the request and store an audit log of the original data set in the non-transitory computer readable storage medium as one of the existing audit logs, wherein the audit log comprises a date, the consumer identity, an identity of the original data set, and a plurality of evidences and each of the evidence is one of the records of the released data set,
wherein the interface further delivers the released data set, the interface further receives a leaking data set, the leaking data set comprising a plurality of leaking records and being defined with a plurality of fields, each of the leaking records having a plurality of items corresponding to the fields of the leaking data set one-on-one, the fields of the leaking data set are classified into a second identity sensitive subset and a second identity insensitive subset,
wherein the processor further determines a filtered audit log set by normalizing a plurality of fields of each of the existing audit logs and selecting the existing audit logs that have at least one field the same as one of the fields of the leaking data set,
wherein the processor further determines a filtered leaking data set by matching the items corresponding to the second identity insensitive subset of each leaking record with the items corresponding to the first identity insensitive subset of the evidences of each existing audit log of the filtered audit log set,
wherein the processor further calculates a confidence factor for each existing audit log of the filtered audit log set by matching the items corresponding to the second identity sensitive subset of each leaking record of the filtered leaking data set with the items corresponding to the first identity sensitive subset of the evidences of each existing audit log of the filtered audit log set, and
wherein the processor further determines a resource of leakage of the leaking data set according to the confidence factors.

2. The traceable data audit apparatus of claim 1, wherein the de-identification operation is a round operation when a to-be-processed item is a numeric, the processor decides an error boundary according to a multiple, and the processor applies the de-identification operation to the to-be-processed item by rounding the to-be-processed item into a rounded numeric by the multiple, generating a random error bounded by the error boundary, and synthesizing the random error and the rounded numeric by either adding the random error to the rounded numeric or subtracting the random error from the rounded numeric.

3. The traceable data audit apparatus of claim 2, wherein the error boundary is a half of the multiple.

4. The traceable data audit apparatus of claim 1, wherein the de-identification operation is an encryption operation when a to-be-processed item is a text, and the processor applies the de-identification operation to the to-be-processed item by encrypting a subset of the to-be-processed item by a random encryption key.

5. The traceable data audit apparatus of claim 4, wherein the processor further encrypts the random encryption key by a system public key and the audit log further comprises the encrypted random encryption key.

6. The traceable data audit apparatus of claim 1, wherein the interface further receives the original data set from a first user of a first company, receives a set of de-identification rules from a second user, receives an instruction indicating that the original data set can be released, and releases the original data set.

7. A traceable data audit method for use in an electronic device, the electronic device being stored with an original data set and a plurality of existing audit logs, the original data set comprising a plurality of records and being defined with a plurality of fields, each of the records having a plurality of items corresponding to the fields one-on-one, the fields being classified into a first identity sensitive subset and a first identity insensitive subset, and the traceable data audit method comprising:
(a) receiving a request for the original data set, wherein the request corresponds to a consumer identity;
(b) generating a released data set by applying a de-identification operation to each of the items corresponding to the fields in the identity sensitive subset in response to the request;

(c) storing an audit log of the original data set in the electronic device as one of the existing audit logs, wherein the audit log comprises a date, the consumer identity, an identity of the original data set, and a plurality of evidences, wherein each of the evidence is one of the records of the released data set;

(d) delivering the released data set;

(e) receiving a leaking data set, wherein the leaking data set comprises a plurality of leaking records and is defined with a plurality of fields, each of the leaking records has a plurality of items corresponding to the fields of the leaking data set one-on-one, the fields of the leaking data set are classified into a second identity sensitive subset and a second identity insensitive subset;

(f) determining a filtered audit log set by normalizing a plurality of fields of each of the existing audit logs and selecting the existing audit logs that have at least one field the same as one of the fields of the leaking data set;

(g) determining a filtered leaking data set by matching the items corresponding to the second identity insensitive subset of each leaking record with the items corresponding to the first identity insensitive subset of the evidences of each existing audit log of the filtered audit log set;

(h) calculating a confidence factor for each existing audit log of the filtered audit log set by matching the items corresponding to the second identity sensitive subset of each leaking record of the filtered leaking data set with the items corresponding to the first identity sensitive subset of the evidences of each existing audit log of the filtered audit log set; and (i) determining a resource of leakage of the leaking data set according to the confidence factors.

8. The traceable data audit method of claim 7, wherein the de-identification operation is a round operation when a to-be-processed item is a numeric, the traceable data audit method further comprises a step for deciding an error boundary according to a multiple, and the step (b) applies the de-identification operation to the to-be-processed item by rounding the to-be-processed item into a rounded numeric by the multiple, generates a random error bounded by the error boundary, and synthesizes the random error and the rounded numeric by either adding the random error to the rounded numeric or subtracting the random error from the rounded numeric.

9. The traceable data audit method of claim 8, wherein the error boundary is a half of the multiple.

10. The traceable data audit method of claim 7, wherein the de-identification operation is an encryption operation when a to-be-processed item is a text and the step (b) applies the de-identification operation to the to-be-processed item by encrypting a subset of the to-be-processed item by a random encryption key.

11. The traceable data audit method of claim 10, further comprising:
encrypting the random encryption key by a system public key;
wherein the audit log further comprises the encrypted random encryption key.

12. The traceable data audit method of claim 7, further comprising:
receiving the original data set from a first user of a first company;
receiving a set of de-identification rules from a second user;
receiving an instruction indicating that the original data set can be released; and
releasing the original data set.

13. A non-transitory computer readable storage medium, having a computer program stored therein, the computer program executing a traceable data audit method after being loaded into an electronic device, the electronic device being stored with an original data set and a plurality of existing audit logs, the original data set comprising a plurality of records and being defined with a plurality of fields, each of the records having a plurality of items corresponding to the fields one-on-one, the fields being classified into a first identity sensitive subset and a first identity insensitive subset, and the traceable data audit method comprising:

(a) receiving a request for the original data set, wherein the request corresponds to a consumer identity;

(b) generating a released data set by applying a de-identification operation to each of the items corresponding to the fields in the identity sensitive subset in response to the request;

(c) storing an audit log of the original data set in the electronic device as one of the existing audit logs, wherein the audit log comprises a date, the consumer identity, an identity of the original data set, and a plurality of evidences, wherein each of the evidence is one of the records of the released data set;

(d) delivering the released data set;

(e) receiving a leaking data set, wherein the leaking data set comprises a plurality of leaking records and is defined with a plurality of fields, each of the leaking records has a plurality of items corresponding to the fields of the leaking data set one-on-one, the fields of the leaking data set are classified into a second identity sensitive subset and a second identity insensitive subset;

(f) determining a filtered audit log set by normalizing a plurality of fields of each of the existing audit logs and selecting the existing audit logs that have at least one field the same as one of the fields of the leaking data set;

(g) determining a filtered leaking data set by matching the items corresponding to the second identity insensitive subset of each leaking record with the items corresponding to the first identity insensitive subset of the evidences of each existing audit log of the filtered audit log set;

(h) calculating a confidence factor for each existing audit log of the filtered audit log set by matching the items corresponding to the second identity sensitive subset of each leaking record of the filtered leaking data set with the items corresponding to the first identity sensitive subset of the evidences of each existing audit log of the filtered audit log set; and (i) determining a resource of leakage of the leaking data set according to the confidence factors.

14. The non-transitory computer readable storage medium of claim 13, wherein the de-identification operation is a round operation when a to-be-processed item is a numeric, the traceable data audit method further comprises a step for deciding an error boundary according to a multiple, and the step (b) applies the de-identification operation to the to-be-processed item by rounding the to-be-processed item into a rounded numeric by the multiple, generates a random error bounded by the error boundary, and synthesizes the random error and the rounded numeric by either adding the random error to the rounded numeric or subtracting the random error from the rounded numeric.

15. The non-transitory computer readable storage medium of claim 14, wherein the error boundary is a half of the multiple.

16. The non-transitory computer readable storage medium of claim 13, wherein the de-identification operation is an encryption operation when a to-be-processed item is a text and the step (b) applies the de-identification operation to the to-be-processed item by encrypting a subset of the to-be-processed item by a random encryption key.

17. The non-transitory computer readable storage medium of claim 16, further comprising:
   encrypting the random encryption key by a system public key;
   wherein the audit log further comprises the encrypted random encryption key.

18. The non-transitory computer readable storage medium of claim 13, further comprising:
   receiving the original data set from a first user of a first company;
   receiving a set of de-identification rules from a second user;
   receiving an instruction indicating that the original data set can be released; and
   releasing the original data set.

* * * * *